United States Patent
Allan et al.

(10) Patent No.: US 8,514,878 B1
(45) Date of Patent: *Aug. 20, 2013

(54) POINT-TO-MULTIPOINT (P2MP) RESILIENCE FOR GMPLS CONTROL OF ETHERNET

(75) Inventors: David Allan, Ottawa (CA); Nigel Bragg, Weston Colville (GB)

(73) Assignee: Rockstar Consortium US LP, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/594,247

(22) Filed: Aug. 24, 2012

Related U.S. Application Data

(63) Continuation of application No. 11/693,937, filed on Mar. 30, 2007, now Pat. No. 8,274,989.

(60) Provisional application No. 60/744,046, filed on Mar. 31, 2006.

(51) Int. Cl.
*H04J 3/26* (2006.01)

(52) U.S. Cl.
USPC ........................................................ 370/432

(58) Field of Classification Search
USPC .................................. 370/432, 465, 351, 399
See application file for complete search history.

(56) References Cited

U.S. PATENT DOCUMENTS

| | | | |
|---|---|---|---|
| 5,909,686 A | 6/1999 | Muller et al. | |
| 6,014,380 A | 1/2000 | Hendel et al. | |
| 6,563,832 B1 | 5/2003 | Stuart et al. | |
| 6,956,868 B2 | 10/2005 | Qiao | |
| 7,170,897 B2 | 1/2007 | Mackiewich et al. | |
| 7,269,132 B1 | 9/2007 | Casey et al. | |
| 7,460,539 B2 | 12/2008 | Yen et al. | |
| 7,471,625 B2 | 12/2008 | Suemura | |
| 8,274,989 B1 * | 9/2012 | Allan et al. | 370/432 |
| 2002/0038253 A1 | 3/2002 | Seaman et al. | |

(Continued)

FOREIGN PATENT DOCUMENTS

WO 02/078250 A2 10/2002

OTHER PUBLICATIONS

Nortel Networks, "Adding Scale, Qos and Operational Simplicity to Ethernet", published at least as early as Jun. 29, 2006, pp. 1-8.

(Continued)

*Primary Examiner* — Mark Rinehart
*Assistant Examiner* — Mohammad Anwar
(74) *Attorney, Agent, or Firm* — Pearne & Gordon LLP

(57) ABSTRACT

In an Ethernet network multiple point-to-multipoint (P2MP) trees are constructed to provide a P2MP service. Each tree provides service from a common root node to common leaves via different paths through the network. GMPLS signaling is utilized for configuring and maintaining the P2MP trees at each of the nodes in the network forming the respective tree. Each tree is constructed using a unique VID/MAC combination wherein the VID is unique to the tree and the MAC is associated with the multicast group identifying the P2MP membership. Traffic is forwarded through the network by the designated tree(s) by the VID/MAC DA combination by the common root node. The varying paths of each tree improves fault tolerance and enables redundancy and protection switching to be provided. Each tree of the service can be modified or repaired while traffic is still being routed through the remaining working tree(s), thus service impact is minimized.

20 Claims, 11 Drawing Sheets

(56) References Cited

U.S. PATENT DOCUMENTS

| | | |
|---|---|---|
| 2004/0037279 A1 | 2/2004 | Zelig et al. |
| 2004/0042454 A1 | 3/2004 | Zabihi et al. |
| 2004/0081171 A1 | 4/2004 | Finn |
| 2004/0103209 A1 | 5/2004 | Kinoshita et al. |
| 2005/0220096 A1 | 10/2005 | Friskney et al. |
| 2006/0002370 A1 | 1/2006 | Rabie et al. |
| 2006/0029032 A1 | 2/2006 | Allan et al. |
| 2007/0159971 A1 | 7/2007 | Zhang et al. |

OTHER PUBLICATIONS

David Allan, et al., "Ethernet as Carrier Transport Infrastructure", Broadband Access Series, IEEE Communication Magazine, Feb. 2006, pp. 134-140.

Frank Brockners, et al., "Metro Ethernet-Deploying the extended Campus using Ethernet Technology", Proceedings of the 28th Annual IEEE International Conference on Local Computer Networks (LCN'03), IEEE Computer Society, 2003.

R. Garcia, et al., "LSOM: A Link State Protocol Over Mac Addresses for Metropolitan Backbones Using Optical Ethernet Switches", Proceedings of the Second IEEE International Symposium on Network Computing and Applications (NCA'03), IEEE Computer Society, 2003.

Girish Chiruvolu, et al., "Issues and Approaches on Extending Ethernet Beyond LANs", Ethernet Transport Over Wide Area Networks, IEEE Communications Magazine, Mar. 2004, pp. 80—86.

Paul Bottorff, et al., "Provider Backbone Bridging Networks A Highly Scalable VLAN (Multicast) Architecture", Broadband Networking, Technology Department, Universitat Pompeu Fabra. Oct. 15, 2004. pp. 1-72. URL:http://www.tecn.upf.es/-dsala/events/MEFoct04.html.

* cited by examiner

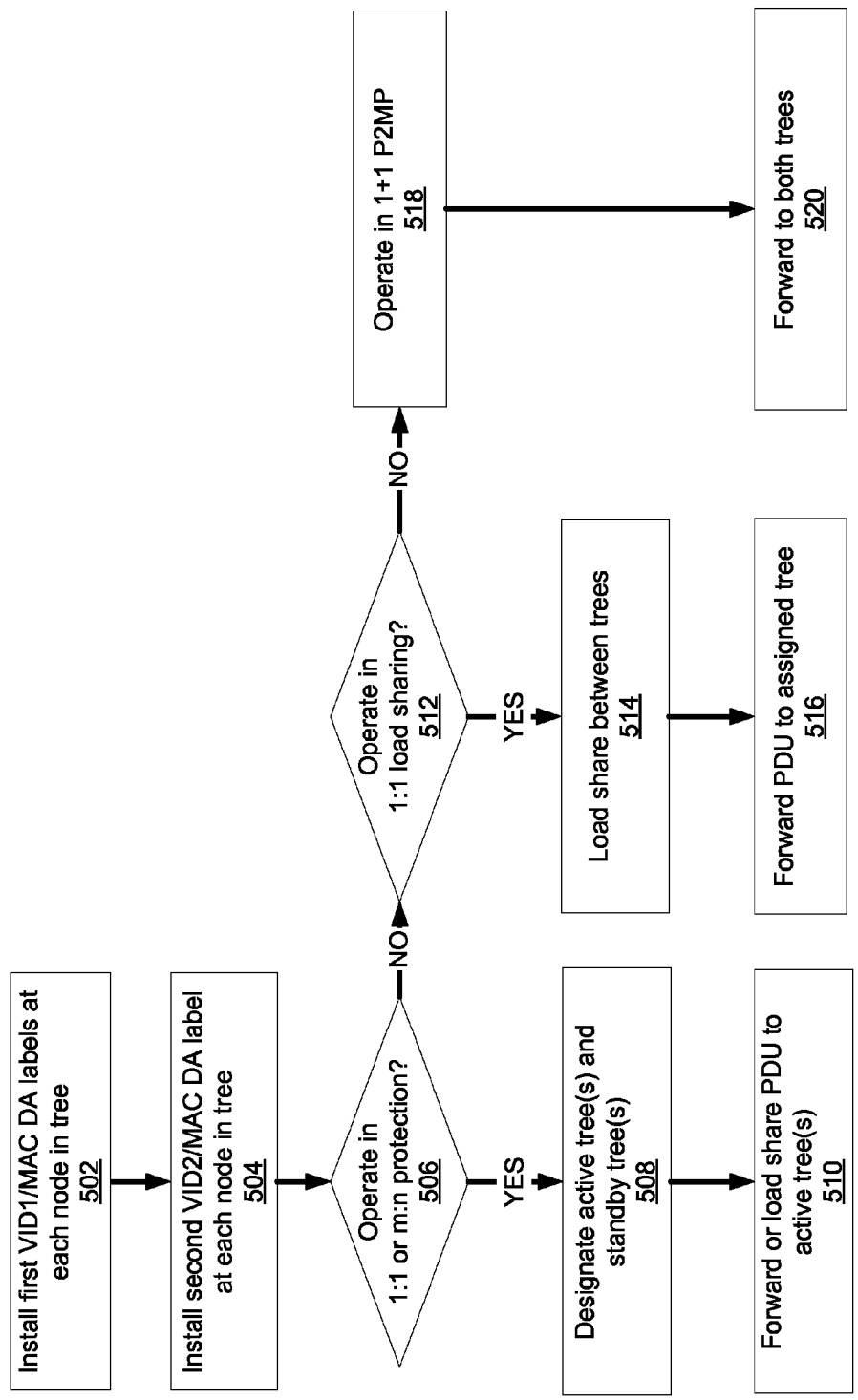

POINT-TO-MULTIPOINT (P2MP) RESILIENCE FOR GMPLS CONTROL OF ETHERNET

CROSS-REFERENCE TO RELATED APPLICATIONS

This application is a continuation application of U.S. patent application Ser. No. 11/693,937 filed Mar. 30, 2007, the content of which is hereby incorporated herein by reference, which application claims the benefit of priority under 35 U.S.C. §119(e) to U.S. Provisional Patent Application Ser. No. 60/744,046 filed Mar. 31, 2006, which is also hereby incorporated by reference.

TECHNICAL FIELD

The present invention relates to GMPLS signaling and particularly to configuring Ethernet capable switches to provide resilient point-to-multipoint connectivity.

BACKGROUND

Ethernet switches are growing in capability. As a consequence the role of Ethernet is rapidly expanding in networks that were the domain of other technologies such as SONET/SDH TDM and ATM. The question of how Ethernet will evolve and what capabilities it can offer in these areas is still under development.

Ethernet as specified today is a system. How spanning tree, data plane flooding and MAC learning combine to populate forwarding tables and produce resilient any-to-any behavior in a bridged network is well understood. What is less obvious is that the resulting behavior is purely a consequence of this particular combination of functions combined with what the underlying hardware can do, and that by simply disabling some Ethernet functionality, it is possible to employ alternative control planes and obtain different forwarding behaviors.

It is desirable to be able to drive Ethernet towards increasingly deterministic behavior. One behavior of note is that of Provider Backbone Transport (PBT) as disclosed in commonly assigned U.S. patent application no. US20050220096 filed Apr. 4, 2004 and hereby incorporated by reference. Using PBT, Ethernet switches may perform PBT MAC forwarding on the basis of a statically configured VID/MAC tuple. This means the forwarding hardware performs a full 60 bit lookup (VID(12)+MAC DA (48)) only requiring uniqueness of the full 60 bits for forwarding to resolve correctly.

Generalized Multi-protocol Label Switching (GMPLS) extends MPLS to provide the control plane (signaling and routing) for devices that switch in any of these domains: packet, time, wavelength, and fiber. GMPLS signaling is well suited to setup paths with labels but it does require a minimal IP control plane and IP connectivity so it is suited to certain scenarios where a large number of paths or dynamic path management is required. The common control plane promises to simplify network operation and management by automating end-to-end provisioning of connections, managing network resources, and providing the level of QoS that is expected in the new, sophisticated applications.

Ethernet provider backbone transport (PBT) paths are controlled utilizing Generalized Multi-protocol Label Switching (GMPLS) signaling protocol as described in commonly assigned U.S. patent application Ser. No. 11/580,796 filed on Oct. 13, 2006. A path between edge nodes is identified by a combination of a VID and destination MAC address in a VID/MAC tuple populated in the forwarding tables of intermediary nodes. To establish the PBT path, a path calculation is performed from the originator node to the terminator node through the network. The originating node then sends a GMPLS label object with a preferred VID/MAC to identify the path to the originator. The intermediary nodes or bridges forward the object to the terminating node. The terminating node then offers a VID/MAC tuple in a GMPLS label object for the path to the terminating node in response. When the intermediary nodes forward the response from the terminating node to the originator, the appropriate forwarding labels are then installed in the forwarding tables of each node utilizing the associated VID/MAC tuples.

As Ethernet expands into provider network these is a need to leverage the benefits of GMPLS deterministic behavior with the flexibility of Ethernet. MPLS signaling has recently been extended to include P2MP and GMPLS could be trivially extended to take advantage of this. Point-to-multipoint (P2MP) trees mapped though Ethernet networks can be vulnerable to network failures. In the MPLS world such failures are normally handled via either local repair techniques or control plane restoration. However, in the case of P2MP trees mapped though Ethernet, the normal operation of conventional resiliency schemes can result in highly undesirable results (and such issues are not exclusively confined to Ethernet). A single failure may impact a significant number of leaves on the tree for which restoration becomes a non-trivial undertaking. Reconstructing a completely new P2MP tree from scratch is not an option due to the time and resources required. Attempts to incrementally modify a live tree to circumvent a network failure may introduce loops and potentially leave forwarding artifacts. Restoration of a tree requires incrementally signaling new connectivity to each leaf which may take a large amount of time. Further the computation required for optimal trees may be non-trivial (e.g. Steiner tree which is an NP-hard problem), suggesting pre-planned resilience options are required.

Accordingly, methods and apparatus enabling Point-to-multipoint (P2MP) resilience for GMPLS control of Ethernet remain highly desirable.

SUMMARY

In an Ethernet network multiple point-to-multipoint (P2MP) trees are constructed to provide a P2MP service. Each tree provides service from a common root node to common leaves (destination nodes) via different paths through the network. This P2MP service reduces the potential downtime due to path failures or network topology changes The varying paths of each tree improves fault tolerance and enables redundancy and protection switching to be provided. Constructing multiple P2MP trees for the same services enables operation in a 1+1 (tail end switched) traffic distribution or 1:1 (head end switched) protection or load sharing configuration. It is also possible to do m:n protection whereby one or more backup paths is shared by multiple working paths. GMPLS signaling is utilized for configuring and maintaining the P2MP trees at each of the nodes in the network forming the respective tree. Each tree is constructed using a unique VID/MAC combination wherein the VID is unique to the tree and the MAC is associated with the multicast group identifying the P2MP membership. Traffic is forwarded through the network by the designated tree(s) by the VID/MAC DA combination associated with the protocol data units (PDUs) by the common root node of the trees. Multiple trees associated with the P2MP service enables the trees to be modified or repaired while traffic is still being routed through the remaining working tree(s), thus service impact is minimized. Pre-construction multiple trees for the same P2MP service and operating the service in a traffic distribution, load sharing or protection configuration improves service availability and reliability.

In accordance with an aspect there is provided a method of operating a resilient point-to-multipoint (P2MP) service in an Ethernet network, the method comprising the steps of receiving at a root node a P2MP protocol data unit (PDU) associated with the P2MP service; determining at the root node a mode of operation for the P2MP service, the P2MP service based upon media-access-control (MAC) destination address (MAC DA) associated with the PDU and the P2MP service; determining a forwarding path for the PDU, the path being associated with one of a plurality of trees from the root node to a plurality of common destination nodes forming the P2MP service, wherein each tree is identified by a unique virtual LAN identifier (VID) and the MAC DA forming a VID/MAC DA tuple, and forwarding the PDU through the network to the destination nodes by a path associated with the VID/MAC tuple.

In accordance with another aspect there is provided a root node in an Ethernet network, the root node configured for resilient point-to-multipoint (P2MP) service, the node comprising a routing system module for establishing a plurality of P2MP trees through nodes of the Ethernet network; a forwarding table comprising a plurality of forwarding, each entry defining one of a P2MP tree instance of the P2MP service from the root node to common destination nodes, wherein the each forwarding entry comprises a virtual LAN identifier (VID) associated with one of the plurality of trees and a common destination media-access-control (MAC) address (MAC DA) forming a VID/MAC tuple; and a forwarding module for forwarding PDUs to a port associated with one or more of the P2MP trees based upon the forwarding entries and a mode of resilience operation of the P2MP service.

In accordance with yet another aspect there is provided a method for resilient point-to-multipoint (P2MP) connectivity in an Ethernet network, the method comprising steps of creating a plurality of diverse P2MP trees through the network, each tree defined from a common root node to a plurality of common destination nodes, each path being identified by the combination of a unique virtual LAN identifier (VID) assigned to the tree and a common destination media-access-control (MAC) address (MAC DA) forming a VID/MAC tuple; and routing protocol data units (PDUs) to one of the plurality of diverse P2MP trees based upon the VID/MAC DA tuple.

Other aspects and features of the present invention will become apparent to those ordinarily skilled in the art upon review of the following description of specific embodiment of the invention in conjunction with the accompanying figures.

BRIEF DESCRIPTION OF THE DRAWINGS

Further features and advantages of the present invention will become apparent from the following detailed description, taken in combination with the appended drawings, in which:

FIG. 5 is a illustration of a method for configuring P2MP trees;

It will be noted that throughout the appended drawings, like features are identified by like reference numerals.

DETAILED DESCRIPTION

Figure 1:
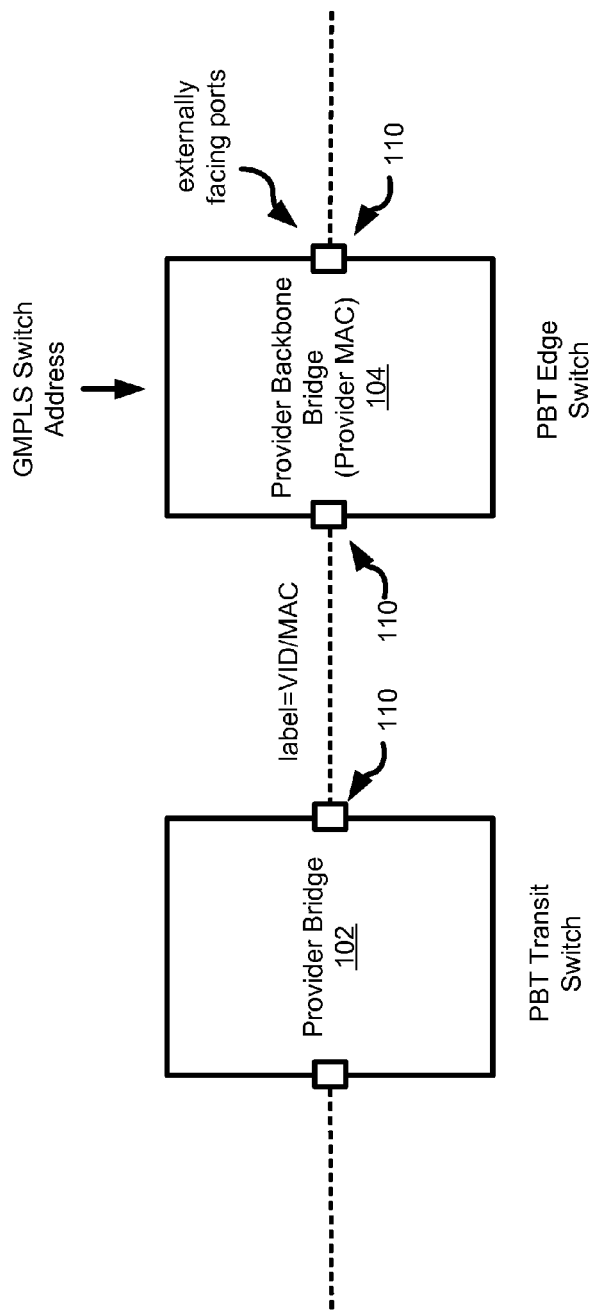
FIG. 1 is a schematic representation of Ethernet/GMPLS addressing and label space.

Embodiments of the present invention are described below, by way of example only, with reference to FIGS. 1-10.

In addition to well understood Generalized Multi-Protocol Label Switching (GMPLS) terms, terminology from IEEE 802.1 and the following terms are used:
MAC: Media Access Control
VID: VLAN ID
B-VID: Backbone BID
B-VLAN: Backbone Virtual LAN
C-MAC: Customer MAC
C-VID: Customer VLAN ID
DA: Destination Address
ESP: Ethernet Switched Path
PBB: Provider Backbone Bridge
PBT: Provider Backbone Transport
SA: Source Address
S-VID: Service VLAN ID Ethernet consists of a very simple and reliable data plane that has been optimized and mass produced. To enable 802.1 to scale to large network a hierarchy between bridges has been defined. Customer bridges at the edge of the network define a C-MAC and C-VID for routing traffic entering the provider network as defined by 802.1Q. Provider bridges can then add a S-VID to traffic within the provider network for routing as per 802.1ad. The S-VID is added at the ingress bridge and removed at the egress bridge. Similarly the provider backbone bridges 106 add a DA, SA and a VID unique to the PBB network as per 802.1ah for routing through the backbone network. The MAC addresses and VID can then be used as a VID/MAC tuple for PBT path configuration. The 802.1 hierarchy and the addition of PBT ensures that data can be routed effectively between networks.

PBT redefines the semantics of using the constituent elements to get complete route freedom for each 60 bit forwarding entry while maintaining the overall requirement for global uniqueness. A PBT design decision was to preserve the global uniqueness and semantics of MAC addresses as interface names, but redefining the semantics associated with administration and use of VLAN values. The VLAN space is partitioned and a range of VIDs (say 'n' VIDs) allocated as only significant when combined with a destination MAC address. With this re-casting of the role of the VLAN tag, the VID can then be considered as an individual instance identifier for one of a maximum of 'n' point-to-point (P2P) connections or multipoint-to-point (MP2P) multiplexed connections terminating at the associated destination MAC address or 'n' P2MP trees per group multicast MAC address permitting an Ethernet interface to root an arbitrarily large number of P2MP MAC configured trees. While PBT can be manipulated quite simply by a management system, and many of the requisite functions already exist to do so, it is considered advantageous to also specify a distributed means in the form of a signaling system to configure PBT forwarding in a GMPLS environment.

One simple mode of tree creation is by configuration. Node by node a tree can be created by simple configuration or by a set of commands originating from a management station. One improvement to node by node configuration is to use single ended provisioning and signaling. The signaling protocol GMPLS already contains many requisite features and may be adapted to signal PBT tree setup with protocol and semantic modifications.

For a GMPLS based system the GMPLS node address/ logical port is the logical signaling identifier for the control plane via which Ethernet layer label bindings are solicited as shown in FIG. 1. To create a point-to-point or point to multi-point path between the PBT transit switch 102, a provider bridge, to the PBT edge switch 104, a provider backbone bridge, an association must be made between the ingress and egress nodes defined by the VID/MAC DA Ethernet label. The specific ports 110 of the GMPLS switch address on a Provider network node are identified by one or more of a MAC address, a 32 bit IPv4 node address, a 128 bit IPv6 address plus 32 bit port Identifier, and one (or more) mnemonic string identifiers based on the port index and MAC address. However, the actual PBT label distributed via signaling and instantiated in the switch forwarding tables contains the egress interface name (MAC address) of the port on the egress PBB. Depending on how the service is defined and set up, one or more of these labels may be used for actual setup. It is also to be noted that although it is possible for an originating or terminating node to offer any 60 bit label value that can be guaranteed to be unique, the convention of using MAC addresses to name specific ports (unicast case) or multicast groups (multicast case) is retained, an Ethernet port name or group address being common to both PBT and bridging modes of operation. One implication of this is that a port index and a MAC address of a port on the node may be effectively interchangeable for signaling purposes although incorrect information can result in an incorrect association between a GMPLS node address and the set of MAC named interfaces local to that node.

GMPLS uses identifiers in the form of 32 bit number which are in the IP address notation but these are not IP addresses. An IP routing control plane for the propagation of traffic engineering information may be supported or the paths may be pre-computed off line. The provider MAC addresses are exchanged by the link layer discovery protocol (LLDP) and by link management protocol (LMP) if supported. Actual label assignment is performed by the signaling initiator and terminator. This multiple naming convention leaves the issue of resolving the set given one of the port identifiers. On a particular node, mapping is relatively straight forward. The preferred solution to this is to use the GMPLS IP node address for signaling resolution.

The data plane for PBT has three key fields, VID, MAC DA and MAC SA. A P2P or P2MP connection instance is uniquely identified by the MAC DA, VID and MAC SA for the purpose of the provider network terminations. The VID and MAC DA tuple identifies the forwarding multiplex or P2MP tree. This results in unique labels end to end and no merging of tunnels. The data streams may multiplex but there is sufficient information in the packet header to permit the connection to be de-multiplexed downstream. In a P2MP situation a group multicast MAC address is used as the destination with the unicast source MAC address identifying the root of the P2MP tree. In a given VLAN a group multicast address should only have one root by convention.

In the P2MP environment, in order to minimize the impact of failures, multiple trees for a P2MP service originating from a common root or source node to common destination nodes, or leaves, can be pre-constructed. The trees will have common source and destination MAC information and are distinguished by different VLANs in the data plane. Each tree is defined by a VID/MAC DA tuple.

Pre-construction of the redundant trees reduces the potential downtime. P2MP service can operate as 1+1 (tail end switched) traffic distribution or 1:1 (head end switched) protection or load sharing configuration. It is also possible to do m:n protection whereby one or more backup paths is shared by multiple working paths. Head end switched requires each P2MP tree to have an associated multipoint to point (MP2P) unicast return path for alarm indication signal (AIS) notifications back to the root node. Tail switched resiliency can use any of several mechanisms to determine which tree in the P2MP service to accept traffic from, unidirectional Connectivity Fault Management (CFM) flows being an exemplar.

Maintenance procedures that do not impact service requires an m:n, 1:1 or 1+1 tree construct. The root moves traffic off the P2MP tree on which maintenance is to be performed (over to a pre-existing alternate tree) and the protection switching state is locked (PS not allowed). Explicit path teardown of leaves to be modified is required to ensure no loops are left behind as artifacts of tree modification. Once modifications are complete, a forced switch to the modified tree occurs and the unmodified path may be similarly updated to maintain synchronization of both the working and backup paths. This also suggests that with m:n, 1+1 or 1:1 (switched or load sharing) resilience can be achieved for P2MP trees for any single failure by either selecting a different stream (1+1) or moving traffic off the failed path to an alternate and using restoration techniques to repair the failed path of the tree.

Figure 2:
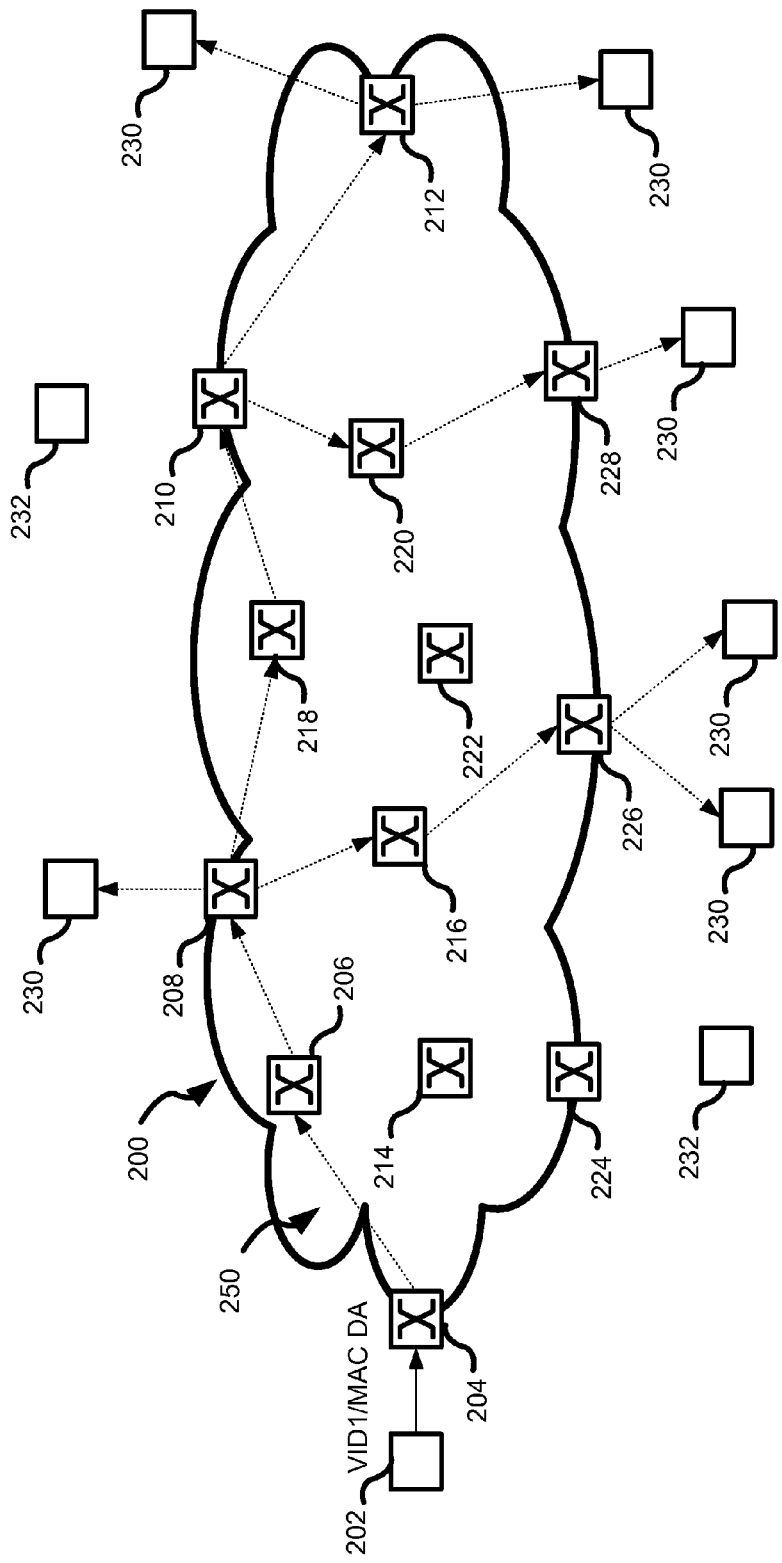
FIG. 2 is a schematic representation of a first P2MP tree.

FIG. 2 illustrates the construction of a P2MP tree. The specific instance uses a unique VID1 to identify connectivity between a common root and set of leaves and the MAC DA address which is associated with the multicast group (identifies the set of leaves). The network 200 is composed of multiple edge nodes 204, 208, 210, 212, 224, 226 and 228 and core nodes 206, 214, 216, 218, 220, and 222. The edge nodes connect to the destination nodes, where nodes 230 are part of the P2MP service and nodes 232 are not part of the P2MP service. Origination node 202 connects to edge node 204. The multicast VID and group multicast address for the DA is selected or assigned to the instance of the P2MP tree, and the unique combination of the VID/MAC DA, is utilized by nodes in the network 200 to route data traffic or protocol data units (PDUs) to the destination leaves through the defined instance. In this example the tree 250 show the flow of PDUs to the leaves 230 through core nodes 204, 206, 216, 218, 220 to edge nodes 208, 210, 212, 226 and 228. A defined route is created between nodes within the network for forwarding the PDUs out to the edge.

Figure 3:
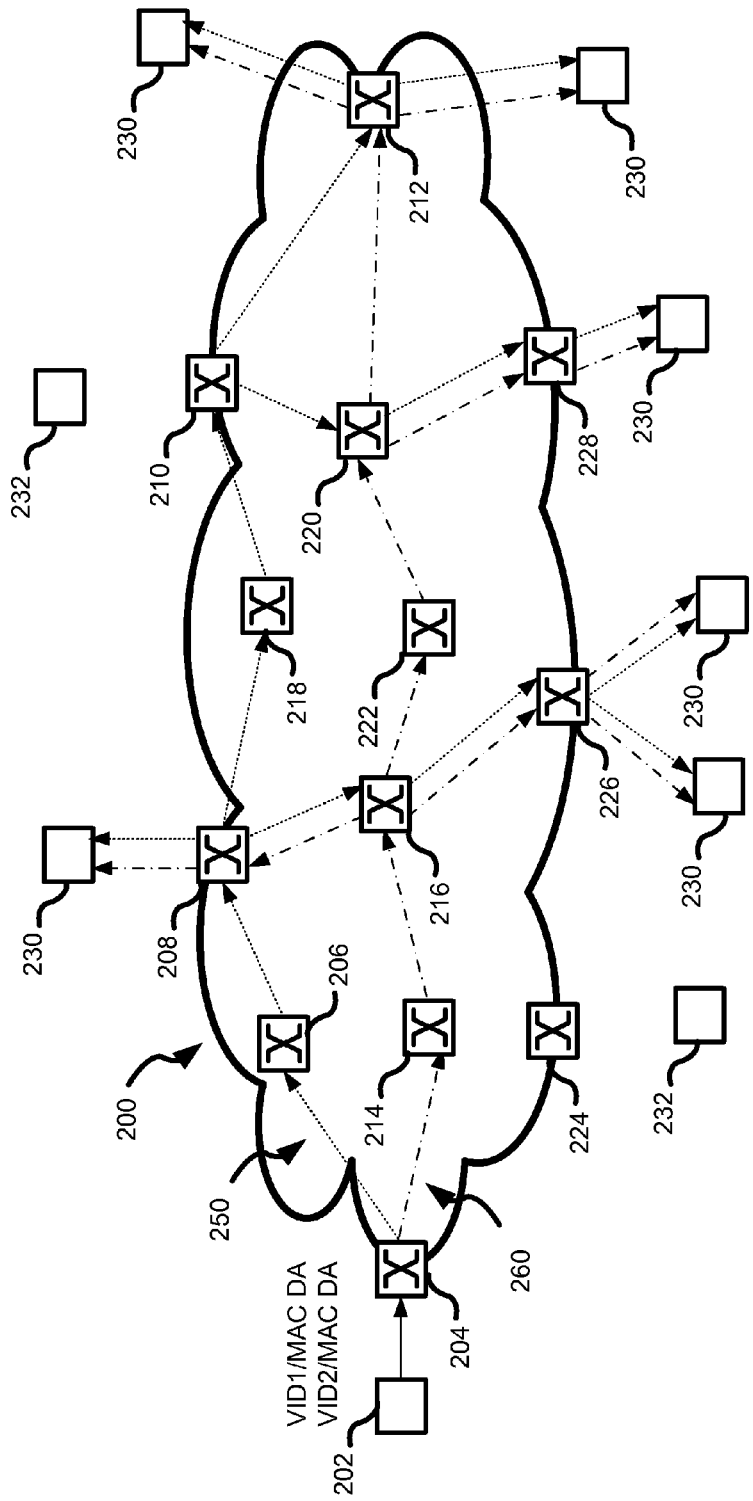
FIG. 3 is a schematic representation of the first and a second P2MP trees.

FIG. 3, in addition to VID1/MAC DA tree instance, illustrates the construction of a second path for the P2MP service utilizing VID 2 to designate the tree from the common source to the same leaves however a different tree structure through the network is created than for VID 1. The MAC DA remains the same as it is used to designate the set of destination nodes or leaves. The created tree 260 traverses different network nodes 214, 216, 222, 220 to reach edge nodes 208, 212, 226 and 228. The tree structure terminates at the same leaves as VID1 however the tree created through the network is not the same, although some commonality may exist. Each tree, designated by VID1/MAC DA and VID2/MAC DA reaches the same destination forming the P2MP service. The differences in tree structure that is created with each VID/MAC DA combination provides redundancy in the event that a fault occurs. It should be understood that although only two trees are shown, multiple trees may be created in the m:n configuration using unique VID to designate each tree. Creating multiple trees for the same P2MP service may provide improved path redundancy and efficiency.

Figure 4A:
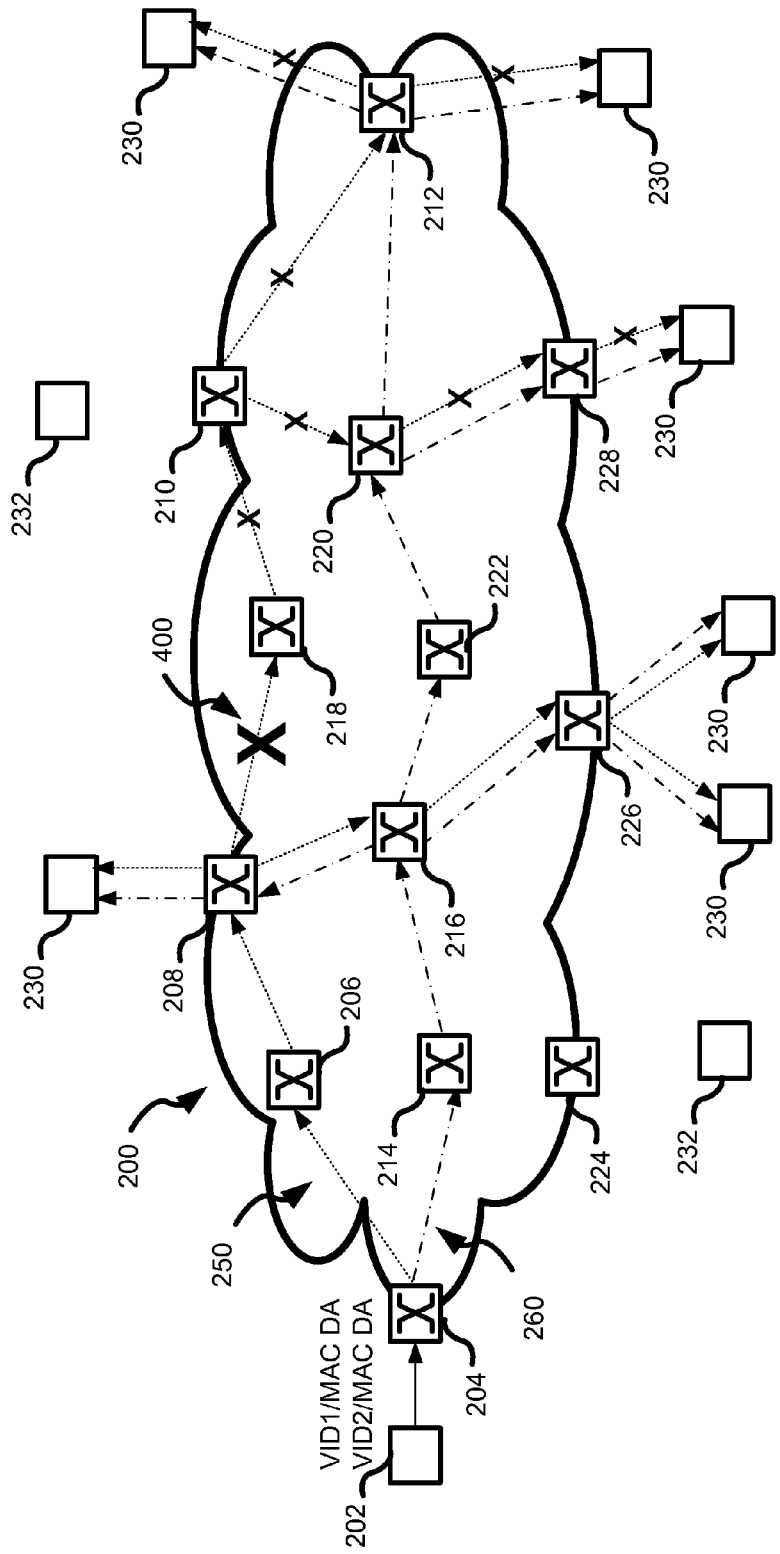
FIG. 4a is a schematic representation of the a failure in the first P2MP tree.

As shown in FIG. 4a if a failure 400 occurs in one of the links between node 208 and 218, this failure would impact delivery of the PDUs to downstream nodes. However this failure would not impact VID2/MAC DA tree as the link is not common between the two paths. Traffic could then be routed on VID2/MAC DA to continue operation of the service. A shown in FIG. 4b, in order to repair the tree for VID1/MAC DA, a new path 402 through the network must be created to bypass the failed link, for example from node 208 to node 222 and back to node 218.

There would be obvious inefficiency in forwarding PDUs through both trees simultaneously for path protection in a 1+1 operation (although desirable in some scenarios). Alternatively the trees can be administered in a 1:1 resilience operation 1:1 load sharing or m:n operation for implementing path protection. Protection switching coordination requires that PDUs are flooded unidirectionally from the root to leaves. In a 1:1 protection scenario one path must be designated as live or active while the remaining path will be standby or inactive. Alternatively, in a 1:1 load sharing traffic can be load balanced between the individual trees at the root node. In m:n where the overall number of trees exceeds the number of active trees, some are active and some standby and the mode of operation being to load share across the active trees. In 1+1 scenarios traffic can be sent on both trees and the leaf node or edge node would select which PDUs to utilize. In any of the scenarios if one of the distribution paths experiences a disruption of service, the flow of traffic can easily be redirected to the other tree for processing. The impacted tree can either be rebuilt with new forwarding entries or await repair. As a general principle, a live tree is never modified, traffic is administratively shifted off a tree to be modified, the tree is then modified, and where appropriate, traffic shifted back.

A method of creating the P2MP trees is show in FIG. 5. At step 502 the VID/MAC DA labels are installed at each node in the tree path to the destination nodes. The determination of the VID selected and the path determination for each tree may occur as part of procedures which utilizing GMPLS signaling as described in co-pending application Ser. No. 11/580,796. The P2MP tree is constructed via incremental addition of leaves to the tree in signaling exchange where the root is the originating switch (procedures known as root initiated join). The multicast VID/MAC DA are encoded in the suggested label object using the Ethernet label encoding. Where a return path is required the unicast MAC corresponding to the originating interface and a VID selected from the configured VID/MAC DA range is encoded as an Ethernet label in the upstream label object. The VID is administered locally from the central pool of VLAN IDs corresponding to the configured VID range. This is possible as the MAC information has the dual role of providing uniqueness to the VID as well as identifying the interface of interest. The P2MP VID tree is constructed via incremental addition of leaves to the tree in signaling exchange where the root is the originating switch.

At step 504 VID2/MAC labels are installed to create a second tree utilizing a different path through the network than VID1 for the same MAC DA leaves. As part of the GMPLS signaling process during configuration of the trees, nodes in the network that are part of paths for VID1 and VID2 may either be assigned or negotiate paths to ensure links are not shared. This may be achieved by simply ensuring that common forwarding entries do not exist for both VIDs where possible or via well understood techniques such as graph splitting in computing diverse paths. It should also be understood that edge nodes will obviously have common forwarding entries for both VIDs as they have a common structure. Maximizing path diversity minimizes the possibility that a link failure will impact both paths. If multiple trees are required, for example in the m:n scenario, step 504 would be repeated with a unique VID for each tree to be created for the P2MP service.

Determination of which mode of operation is to be utilized is determined at step 506. If 1:1 or m:n protection is to be utilized, YES at step 506, one or more of the trees is designated as active and the other tree(s) as standby at step 508. This designation may be administered at the head end node 204 when forwarding traffic onto the network at step 510. If NO at step 506, it is then determined if 1:1 load sharing is being utilized where the traffic is distributed between the two trees. If traffic is to be distributed, YES at step 512, each packet is assigned to one of the two trees based upon load sharing configuration at the head end node 204 at step 514. Traffic is then forwarded to the assigned path at step 516. If 1:1 load sharing is not being utilized, NO at step 512, 1+1 protection operation is utilized at step 518 and the P2MP traffic is replicated and forwarding at step 520 onto both trees. The root node 204 would then distribute P2MP traffic onto each of the paths and the leaves of the P2MP tree select which path to accept traffic from. Although many techniques can be employed for load sharing, it works best in the scenario whereby the P2MP tree actually transports an aggregate of multicast information such that spreading techniques that preserve flow ordering for individual multicast streams can be employed.

Maintenance and modification to a P2MP tree can be achieved by a number of means. The preferred technique is to move traffic off the tree to a backup or alternate tree, modify the tree and then shift traffic back to the tree as opposed to constructing a new tree. In the 1+1 case, the root simply stops replicating traffic onto the tree to be modified. This ensures that there are no transient loops in the tree that are artifacts of interactions of the GMPLS control plane, soft state and the Ethernet data plane.

It is required to associate the working and protection trees into a protection group. This is achieved using the ASSOCIATION and PROTECTION objects. The 'P' bit in the protection object indicates the role (working or protection) of the LSP currently being signaled. It should be noted that by convention the role of working or protection are "sticky" and not relative to the current protection switched state.

If the initiating node wishes to use ITU (International Telecommunication Union) G.8031 data plane protection switching coordination (vs. control plane notifications), it sets the N bit to 1 in the protection object. This must be consistently applied for all paths associated as a protection group. If the terminating switch does not support G.8031, the error "Admission Control Failure/Unsupported Notification Type" is used.

Figure 6:
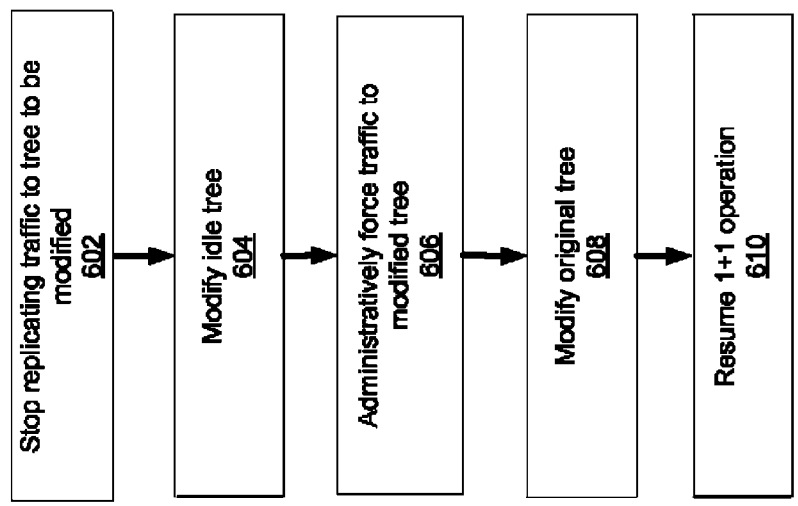
FIG. 6 is an illustration of a method for modifying 1+1 P2MP trees.

FIG. 6 illustrates how a 1+1 P2MP configuration would potentially be modified once in operation. Modification may occur when there is a network topology change or change to the membership of the P2MP service. Under normal operation, traffic is inserted into both trees, and the tail end or leaves selects which tree to use. The selection can be via monitoring of OAM PDUs inserted by the root or via other means. To start the modification process traffic must be administratively forced to only one of the two trees by root node 204 at step 602 by stopping replication of traffic onto the tree that is to be modified. The idle tree can then be modified at step 604 by GMPLS procedures to reflect the new P2MP service. Traffic can then be administratively forced back to the modified tree at step 606. The original tree can then be likewise modified at step 608 to reflect the changes in tree topology and 1+1 P2MP operation resumes on both trees at step 610.

Figure 4B:
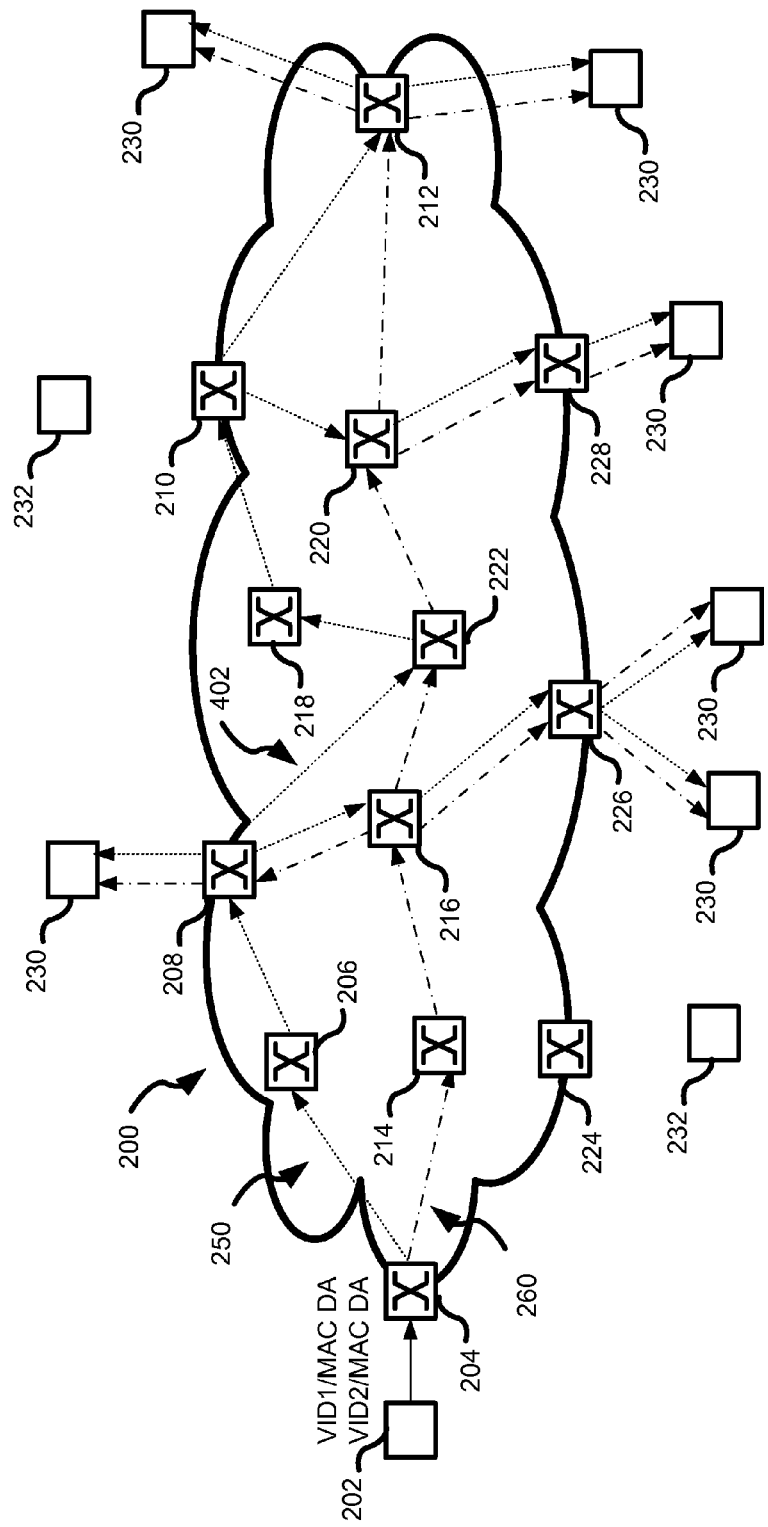
FIG. 4b is a schematic representation of the restoration of the first P2MP tree due to the failure.
Figure 7:
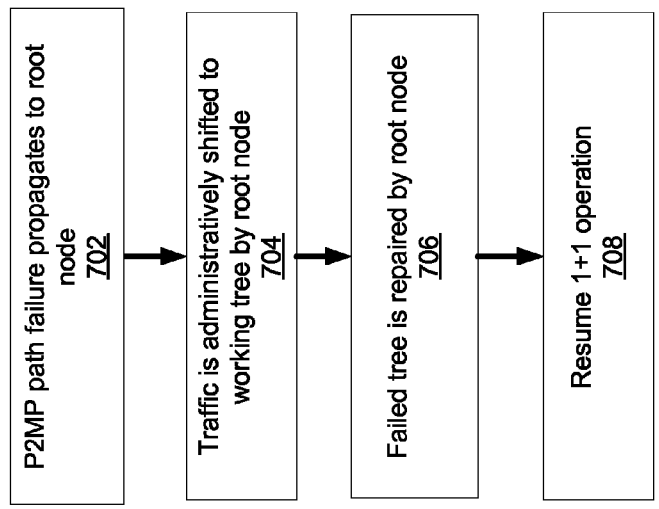
FIG. 7 is an illustration of a method for restoring 1+1 P2MP trees after a failure has occurred.

In the case of a failure in one of the trees, for example failure 400 as shown in FIG. 4*a*, the tree must be reconstructed by an alternate path as shown in FIG. 4*b* by a method such as shown in FIG. 7. The failure is propagated to the root node of the P2MP tree at step 702 via AIS or control plane path error messages. On failure, some number of leaves will choose to accept traffic from the "still working" tree. Traffic is administratively shifted at step 704 to the working tree by the root node 204, in FIG. 5*b* this would be designated by the VID2/MAC DA path. At this point all surviving leaves will choose to receive traffic from the working tree. The failed tree is repaired at step 706, which is shown in FIG. 4*b* by creating a new bypass path through node 222 and updating the appropriate forwarding tables in the nodes. The root node then signals administratively that 1+1 operation can resume and traffic at step 808 and traffic can then be forwarded on to VID1/MAC DA and VID2/MAC DA trees.

Figure 8:
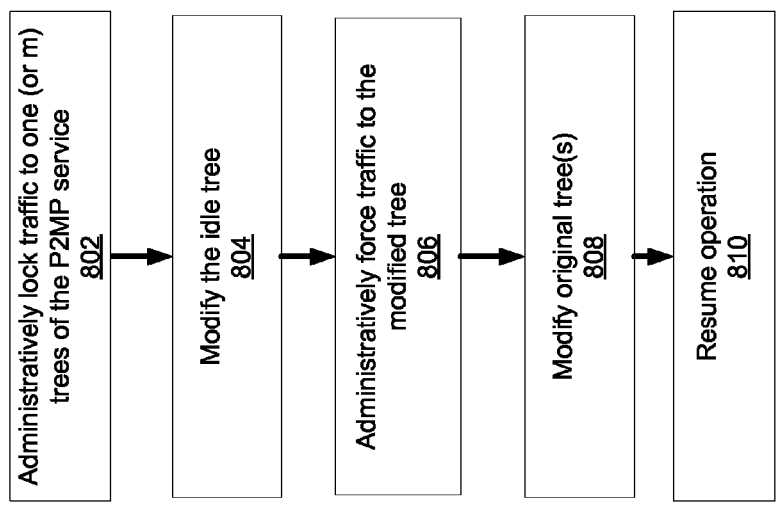
FIG. 8 is an illustration of a method for modifying 1:1 P2MP trees.

In a 1:1 and m:n operation, one (or more) of the trees is operated as a working tree with other trees as the standby tree which is only utilized in event of a network failure or for maintenance purposes. Normal 1:1 resilience operation is to traffic insert into one tree, and reverse notification of fault in that tree triggers a switch to the other tree. Similarly for m:n upon receipt of a reverse notification shifts traffic from the failed tree to one of the standby trees. The P2MP tree can be modified to accommodate network topology changes or changes in group membership affecting tree structure and both trees must be modified to reflected the network change. As shown in FIG. 8, to modify a P2MP tree, traffic is administratively locked one of the trees at step 802. In 1:1 resilience operation traffic is locked to the working tree and the standby tree is essentially idled. Alternatively, in a 1:1 load sharing operation, one of the trees becomes the active tree and the other tree is idled. Finally in the m:n case traffic is shifted from the tree to be modified to a standby tree. The idle tree is modified at step 804 by sending updates to forwarding tables of the nodes involved in the tree. Traffic can then be administratively forced to the modified tree at step 806 and the original tree(s) can then be modified at step 808. The trees of the P2MP service now reflect the new tree topology and normal operation can resume at step 810. In a 1:1 resilience operation traffic can then be switched back the original active tree if required. In 1:1 load sharing traffic can be distributed to both trees. In the m:n load sharing steps 806 and 808 many be performed additional times until all the trees in the P2MP service are modified accordingly. Note that head end switching can be implemented to be "hitless", therefore administrative switching of traffic is not service impacting.

Figure 9:
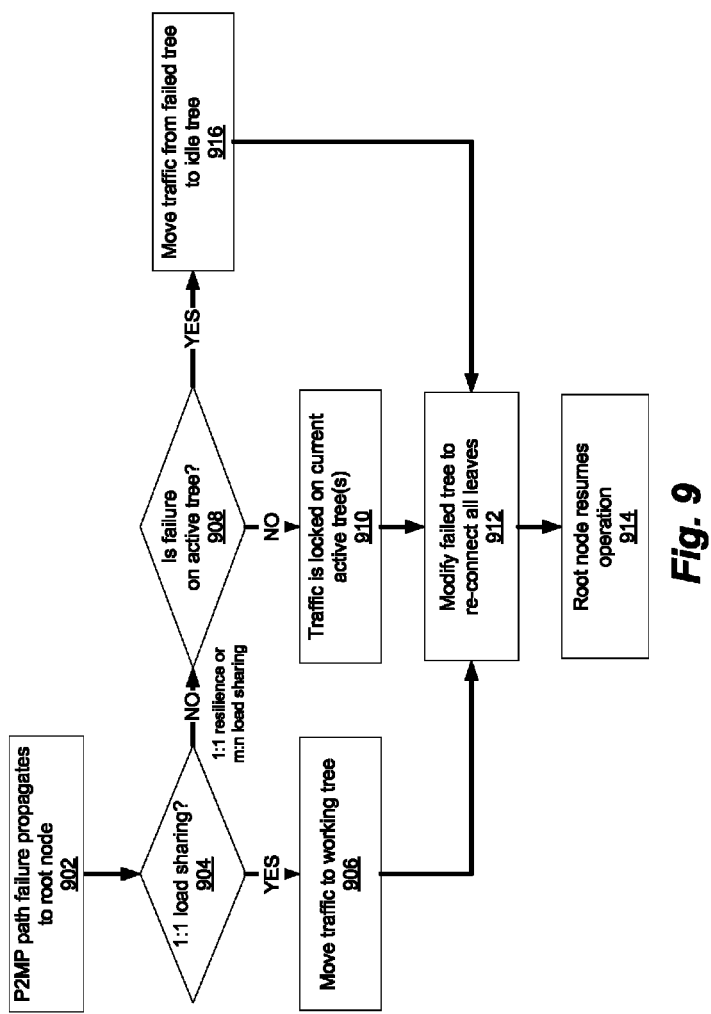
FIG. 9 is an illustration of a method for restoring 1:1 P2MP trees after a failure has occurred.

In normal or load shared 1:1 operation or m:n operation the head end, root or originating node selects which are the currently active trees and which are the standby trees. On failure, fault notification propagates to root of the impacted P2MP tree. As shown in FIG. 9, when a failure occurs in a P2MP tree backed up by a 1:1 or m:n configuration, to get back to a protected state the following method can be utilized. Once notification of the failure has propagated back to the root node, step 902, it must be determined which tree has failed.

Data-plane reverse notifications can be utilized for faster switching time where the control plane messaging indicates which leaves are impacted by the failure. If a 1:1 load sharing configuration is being utilized, YES at 904, traffic must be redirected from the failed path to the working path at step 906. The failed tree is modified to re-connect the leaves of the P2MP tree at step 912. This can be performed by GMPLS signaling to re-establish the appropriate forwarding tables through the network. Once the tree is re-established, normal operation resumes at step 914 with the load balancing between paths.

If 1:1 load sharing operation is not being used, NO at 904, 1:1 resilience or m:n load sharing operation is being utilized. It then must be determined which tree the failure occurred on at step 908. If the failure has occurred on an active tree, YES at step 908, the traffic must be moved onto the idle tree at step 916. The failed tree is modified so that the root and the related leaves are reconnected at step 912. Once the tree is re-established, traffic can be shifted back to the (now) idle tree or can be designated as the standby tree and normal 1:1 or n:m operation resumes at step 914.

If the idle tree has failed, NO at step 908, traffic is locked on the current working tree(s) at step 910. The failed tree is modified to that the root and the related leaves are reconnected at step 912. Once the tree is re-established, normal 1:1 or m:n load sharing operation resumes at step 914 with the standby tree being available.

RSVP-TE make before break techniques can be utilized to avoid double booking the bandwidth when performing maintenance on or modifying a P2MP tree.

It is possible that failures will occur on an active tree before a failed tree can be restored. As traffic typically is locked on one tree and the other is being reconstructed, the multiple failure scenario (which affects the current working tree) will at least partially interrupt service until the tree being reconstructed is restored, at which point traffic is forced onto that tree, and reconstruction of the backup tree is performed restoring the P2MP tree.

Figure 10:
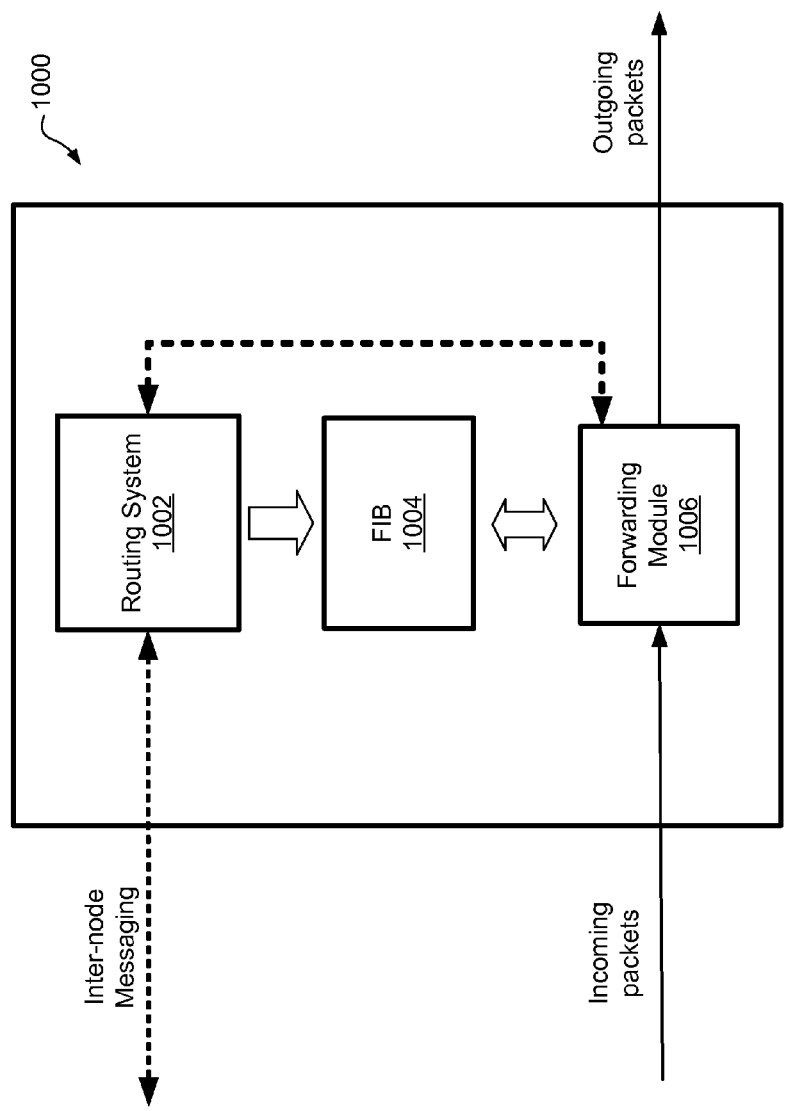
FIG. 10 is a schematic representation of a root node for implementing a P2MP service.

FIG. 10 is an schematic representation of the operation components of a root node 1000 for providing resilient P2MP service. The routing system module 1002 exchanges information with nodes in the network regarding the network topology using GMPLS signaling. The forwarding information base (FIB) 1004 is populated with the appropriate entries for directing traffic through the network based upon the determined paths for each tree of the P2MP service. The entries identify in the FIB are used to define the path for each P2MP tree utilizing the unique VID/MAC DA tuple. When an incoming packet (or PDU) is received, the forwarding module 1006 determines which path the packet should be routed to depending on the current state of the trees associated with the P2MP service. The routing system 1002 through inter-node communication, for example by GMPLS signaling, determines which tree(s) of the P2MP service should be active and which should be inactive or idle depending on service configuration, i.e. 1:1 normal, load sharing, m:n or 1+1 resilience, and operational state of the trees. If a path failure has occurred impacting one of the trees or if group membership changes have occurred requiring tree modification the trees available for forwarding packets and the associated forwarding entries in the FIB 1004 may change. In addition, if a tree must be reconfigured the routing system initiates the modification and restoration functions as previously described through GMPLS procedures to reflect the new topology which may impact the trees and paths available for forwarding packets. Depending on the P2MP service state and operation mode, packets may be routed to specific paths or replicated and forwarded to multiple paths based by the forwarding module 1006. It should also be understood that the modules described are for illustrative purposes only and may be implemented by combining or distributing functions among the modules of a bridge node as would be understood by a person of skill in the art.

The embodiments of the invention described above are intended to be illustrative only. The scope of the invention is therefore intended to be limited solely by the scope of the appended claims.

The invention claimed is:

1. A method of providing resilient point-to-multipoint (P2MP) connectivity in an Ethernet network, the method comprising:
providing at least two different P2MP trees in the Ethernet network, each P2MP tree linking a common root node with a plurality of common destination nodes, each P2MP tree being associated with a respective virtual LAN identifier (VID) and media-access-control destination address (MAC DA) associated with the plurality of common destination nodes, the at least two different P2MP trees being associated with a P2MP service; and
selectively forwarding protocol data units (PDUs) via the P2MP trees based on a respective VID and a respective MAC DA in each PDU.

2. The method of claim 1, wherein the selective routing of PDUs is further based on a mode of resilience operation of the P2MP service.

3. The method of claim 2, wherein the mode of resilience operation is a 1:1 protection mode whereby the PDUs are routed to only one of two different P2MP trees.

4. The method of claim 3, wherein:
one of the two different P2MP trees is designated as active;
the other of the two different P2MP trees is designated as standby; and
the PDUs are routed only to the active P2MP tree.

5. The method of claim 2 wherein the mode of resilience operation is a 1:1 load sharing mode whereby the PDUs are distributed between at least two P2MP trees.

6. The method of claim 2, wherein the mode of resilience operation is a 1+1 mode whereby the PDUs are routed to each of two different P2MP trees and each destination node selects which of the two different P2MP trees to receive traffic from.

7. The method of claim 2, wherein the mode of resilience operation is a m:n mode whereby the PDUs are distributed among m active P2MP trees.

8. The method of claim 7, wherein the PDUs are not routed to n standby P2MP trees.

9. The method of claim 1, comprising identifying each P2MP tree as active or inactive, wherein the PDUs are routed only to active P2MP trees.

10. The method of claim 9, wherein identifying each P2MP tree as active or inactive comprises identifying a P2MP tree as inactive while the P2MP is being modified.

11. The method of claim 9, wherein identifying each P2MP tree as active or inactive comprises identifying a P2MP tree as inactive while there is a failure in the P2MP tree.

12. The method of claim 9, wherein identifying each P2MP tree as active or inactive comprises identifying a P2MP tree is inactive while modifying destination nodes of the P2MP tree.

13. The method of claim 9, comprising:
identifying a failure in one of the active P2MP trees; and
designating as inactive the P2MP tree in which the failure is identified.

14. The method of claim 13, comprising:
designating an inactive P2MP tree as active; and
routing PDUs to the active P2MP tree instead of the P2MP tree in which the failure is identified.

15. The method of claim 13, comprising modifying the P2MP tree in which the failure is identified to avoid the failure.

16. The method of claim 15, comprising designating the modified P2MP tree as active.

17. The method of claim 1, comprising administratively locking traffic out of at least one P2MP tree while modifying the P2MP tree.

18. The method of claim 17, comprising returning traffic to the P2MP tree after modification of the P2MP tree.

19. The method of claim 1, wherein providing at least two different P2MP trees comprises mapping each P2MP tree through the Ethernet network using Generalized Multi-Protocol Label Switching (GMPLS) signaling.

20. A method of operating a resilient point-to-point (P2MP) service in an Ethernet network, the method comprising:
receiving at a root node a P2MP protocol data unit (PDU) associated with the P2MP service;
determining a forwarding path for the PDU based on a mode of operation of the P2MP service, the forwarding path being associated with one of at least two trees from the root node to a plurality of common destination nodes forming the P2MP service, wherein each tree is associated with a unique VID/MAC tuple comprising a respective virtual LAN identifier (VID) associated with the tree and a media-access-control (MAC) destination address (MAC DA) associated with the plurality of common destination nodes of the P2MP service; and
forwarding the PDU through the network to the plurality of common destination nodes by the determined forwarding path using the unique VID/MAC tuple of the selected one of the trees;
wherein the mode of operation is one of 1:1 resilience, 1:1 load sharing, 1+1 distribution and m:n load sharing.

* * * * *